United States Patent
Morisada

(10) Patent No.: US 8,372,768 B2
(45) Date of Patent: *Feb. 12, 2013

(54) OPTICAL GLASS AND OPTICAL APPARATUS USING THE SAME

(75) Inventor: Naoyuki Morisada, Tokyo-to (JP)

(73) Assignee: Olympus Corporation, Tokyo (JP)

( * ) Notice: Subject to any disclaimer, the term of this patent is extended or adjusted under 35 U.S.C. 154(b) by 255 days.

This patent is subject to a terminal disclaimer.

(21) Appl. No.: 12/735,022

(22) PCT Filed: Dec. 11, 2008

(86) PCT No.: PCT/JP2008/072510
§ 371 (c)(1),
(2), (4) Date: Jun. 9, 2010

(87) PCT Pub. No.: WO2009/075325
PCT Pub. Date: Jun. 18, 2009

(65) Prior Publication Data
US 2010/0255981 A1  Oct. 7, 2010

(30) Foreign Application Priority Data

Dec. 11, 2007 (JP) .................................. 2007-319941
Dec. 11, 2007 (JP) .................................. 2007-319942

(51) Int. Cl.
*C03C 3/068* (2006.01)
*C03C 3/066* (2006.01)

(52) U.S. Cl. 501/78; 501/79; 252/301.4 F; 252/301.4 R

(58) Field of Classification Search ................. 501/78, 501/79; 252/301.4 F, 301.4 R
See application file for complete search history.

(56) References Cited

U.S. PATENT DOCUMENTS

| | | | | |
|---|---|---|---|---|
| 4,226,627 A | * | 10/1980 | Inoue et al. | 501/50 |
| 7,138,349 B2 | * | 11/2006 | Uehara et al. | 501/78 |
| 7,659,222 B2 | * | 2/2010 | Shimizu | 501/78 |
| 8,003,556 B2 | * | 8/2011 | Suzuki et al. | 501/78 |
| 8,178,454 B2 | * | 5/2012 | Morisada | 501/78 |
| 2005/0272589 A1 | * | 12/2005 | Shimizu | 501/54 |
| 2010/0271830 A1 | * | 10/2010 | Morisada | 362/317 |

FOREIGN PATENT DOCUMENTS

| | | |
|---|---|---|
| JP | 03-093645 | 4/1991 |
| JP | 03-093648 | 4/1991 |
| JP | 04-219342 | 8/1992 |
| JP | 11-106233 | 4/1999 |

OTHER PUBLICATIONS

International Search Report dated Mar. 17, 2009, issued in corresponding International Application No. PCT/JP2008/072510.

* cited by examiner

*Primary Examiner* — Karl Group
(74) *Attorney, Agent, or Firm* — Kenyon & Kenyon LLP

(57) ABSTRACT

An optical glass in which a Cr content is less than 5 ppm, or a Sm content is 3 ppm or less, with respect to a 100% basic glass composition containing 2-10% $SiO_2$, 5-45% $B_2O_3$, 0-15% RO (R=Zn, Sr, Ca, Ba), 30-60% $La_2O_3$, 0-40% $Ln_2O_3$ (Ln=Y, Gd), and, 0-30% $ZrO_2+Nb_2O_5+Ta_2O_5$ by weight, and an optical apparatus which is provided with an optical system having the optical glass.

5 Claims, 3 Drawing Sheets

OPTICAL GLASS AND OPTICAL APPARATUS USING THE SAME

TECHNICAL FIELD

This invention relates to an optical glass, and in particular, an optical glass used in an optical system for a fluorescence observation and a fluorescence intensity measurement, and an optical apparatus using this optical glass. In particular, this invention relates to an optical glass in which a Cr content or Sm content is reduced to the utmost, where Cr and Sm are elements which emit auto-fluorescent light.

BACKGROUND ART

An observation of single-molecule fluorescence, a measurement of fluorescence intensity of a specimen having low fluorescence intensity, and so on require a highly accurate apparatus for an observation or a measurement in use of a fluorescence observation measurement apparatus such as a fluorescence microscope.

Auto-fluorescent light from a glass used for a lens of an optical system has been known as one of the causes which deteriorate the accuracy of such apparatus in image observation or measurement.

This auto-fluorescent light is fluorescent light which is emitted by a glass of a material for lens after the glass absorbs a part of excitation light when the excitation light passes through the lens to excite a specimen. This auto-fluorescence light makes a highly accurate observation difficult because a superposition of this auto-fluorescent light and fluorescent light which is emitted from a specimen causes loss of information about a dark portion of a fluorescence image. In fluorescence intensity measurement, the auto-fluorescent light becomes background noise and an accurate measurement for a specimen of low fluorescence intensity becomes difficult. The use of a glass the auto-fluorescence intensity of which is reduced makes it possible to carry out a highly accurate observation or measurement.

Also, if ultraviolet light is used as excitation light in a case where a specimen is a living cell or the like in such a fluorescence observation and/or measurement, the living cell may be damaged. For this reason, for example, visible light with a wavelength of 480 nm is often used.

The arts of a glass the auto-fluorescence intensity of which is reduced (, where the glass is called a low fluorescent glass hereinafter,) include an art of a glass in which an impurity content is reduced, as disclosed in Japanese patent Kokai No. Hei 4-219342 and Japanese patent Kokai No. Hei 11-106233. Also, there is a producing method in which a mix of impurities is reduced in production of a glass, as disclosed in Japanese patent Kokai No. Hei 11-106233.

Japanese patent Kokai No. Hei 4-219342 discloses as a glass with low impurity content a low fluorescent glass which contains $As_2O_3$ of 0.05% or less, $Sb_2O_3$ of 0.05% or less, $V_2O_3$ of 10 ppm or less, CuO of 10 ppm or less, and $CeO_2$ of 1 ppm or less as an impurity.

Also, Japanese patent Kokai No. Hei 11-106233 discloses as a glass with low impurity content a low fluorescent glass which contains platinum of 10 ppm or less as an impurity, does not contain arsenic substantially, and does not contain also antimony substantially. Also, the method disclosed as a producing method is a method of producing a glass in which an amount of the impurity is reduced by inhibiting a mix of platinum from a gas phase and a mix of platinum from an interface between a platinum crucible and glass melt.

DISCLOSURE OF THE INVENTION

An optical glass of the present invention is made in such a way that a Cr content is less than 5 ppm, with respect to a 100% basic glass composition containing at least,

| | |
|---|---|
| $SiO_2$ | 2-10% |
| $B_2O_3$ | 5-45%, and |
| $La_2O_3$ | 30-60% | by weight.

Also, an optical glass of the present invention is made in such a way that a Cr content is less than 5 ppm, with respect to a 100% basic glass composition containing

| | |
|---|---|
| $SiO_2$ | 2-10% |
| $B_2O_3$ | 5-45% |
| $La_2O_3$ | 30-60% |
| RO (R = Zn, Sr, Ca, Ba) | 0-15% |
| $Ln_2O_3$ (Ln = Y, Gd) | 0-40%, and |
| $ZrO_2 + Nb_2O_5 + Ta_2O_5$ | 0-30% | by weight.

Also, an optical glass of the present invention is made in such a way that a Cr content is less than 5 ppm, with respect to a 100% basic glass composition containing at least.

| | |
|---|---|
| $SiO_2$ | 2-20% |
| $B_2O_3$ | 5-45%, and |
| $La_2O_3$ | 10-29% | by weight.

Also, an optical glass of the present invention is made in such a way that a Cr content is less than 5 ppm, with respect to a 100% basic glass composition concontaining

| | |
|---|---|
| $SiO_2$ | 2-20% |
| $B_2O_3$ | 5-45% |
| $La_2O_3$ | 10-29% |
| RO (R = Zn, Sr, Ca, Ba) | 0-45% |
| $Ln_2O_3$ (Ln = Y, Gd) | 0-10%, and |
| $ZrO_2 + Nb_2O_5 + TiO_2 + Ta_2O_5$ | 1-20% | by weight.

Also, an optical glass of the present invention is made in such a way that a Cr content is less than 5 ppm, with respect to a 100% basic glass composition containing at least,

| | |
|---|---|
| $SiO_2$ | 2-20% |
| $B_2O_3$ | 5-45% |
| $La_2O_3$ | 10-29% |
| $Al_2O_3$ | 0.1-5% |
| RO (R = Zn, Sr, Ca, Ba) | 1-60% |
| $Ln_2O_3$ (Ln = Y, Gd) | 0-10%, and |
| $ZrO_2 + Nb_2O_5 + TiO_2 + Ta_2O_5$ | 1-10% | by weight.

Also, an optical glass of the present invention contains as a defoaming agent one or more of $Sb_2O_3$, chloride, sulfide, and fluoride, the content of which is 0.01 to 1% by weight with respect to the above-described basic glass composition of 100%.

Further, an optical glass of the present invention contains at least one or more of $Li_2O$, $Na_2O$, $K_2O$, $Rb_2O$, and $Cs_2O$, the content of which is 0 to 10% by weight.

Also, an optical glass of the present invention is made in such a way that a Sm content is 3 ppm or less, with respect to a 100% basic glass composition containing at least,

| | |
|---|---|
| $SiO_2$ | 2-10% |
| $B_2O_3$ | 5-45%, and |
| $La_2O_3$ | 30-60% | by weight.

Also, an optical glass of the present invention is made in such a way that a Sm content is 3 ppm or less, with respect to a 100% basic glass composition containing

| | |
|---|---|
| $SiO_2$ | 2-10% |
| $B_2O_3$ | 5-45% |
| $La_2O_3$ | 30-60% |
| RO (R = Zn, Sr, Ca, Ba) | 0-15% |
| $Ln_2O_3$ (Ln = Y, Gd) | 0-40%, and |
| $ZrO_2 + Nb_2O_5 + Ta_2O_5$ | 0-30% | by weight.

Also, an optical glass of the present invention is made in such a way that a Sm content is 3 ppm or less, with respect to a 100% basic glass composition containing at least,

| | |
|---|---|
| $SiO_2$ | 2-20% |
| $B_2O_3$ | 5-45%, and |
| $La_2O_3$ | 10-29% | by weight.

Also, an optical glass of the present invention is made in such a way that a Sm content is 3 ppm or less, with respect to a 100% basic glass composition containing

| | |
|---|---|
| $SiO_2$ | 2-20% |
| $B_2O_3$ | 5-45% |
| $La_2O_3$ | 10-29% |
| RO (R = Zn, Sr, Ca, Ba) | 0-45% |
| $Ln_2O_3$ (Ln = Y, Gd) | 0-10%, and |
| $ZrO_2 + Nb_2O_5 + TiO_2 + Ta_2O_5$ | 1-20% | by weight.

Also, an optical glass of the present invention is made in such a way that a Sm content is 3 ppm or less, with respect to a 100% basic glass composition containing at least,

| | |
|---|---|
| $SiO_2$ | 2-20% |
| $B_2O_3$ | 5-45% |
| $La_2O_3$ | 10-29% |
| $Al_2O_3$ | 0.1-5% |
| RO (R = Zn, Sr, Ca, Ba) | 1-60% |
| $Ln_2O_3$ (Ln = Y, Gd) | 0-10%, and |
| $ZrO_2 + Nb_2O_5 + TiO_2 + Ta_2O_5$ | 1-10% | by weight.

Also, an optical glass of the present invention contains as a defoaming agent one or more of $Sb_2O_3$, chloride, sulfide, and fluoride, the content of which is 0.01 to 1% by weight with respect to the above-described basic glass composition of 100%.

Further, an optical glass of the present invention contains at least one or more of $Li_2O$, $Na_2O$, $K_2O$, $Rb_2O$, and $Cs_2O$, the content of which is 0 to 10% by weight.

Also, an optical apparatus of the present invention is provided with an optical system having an optical glass which is mentioned above.

According to an optical glass of the present invention, it is possible to realize an optical glass in which the auto-fluorescence intensity is reduced more than that of a conventional glass in the case of radiation of visible light and to realize an optical apparatus using this optical glass.

Because a Cr content is particularly less than 5 ppm in an optical grass of the present invention, a glass the auto-fluorescence of which is weak can be obtained. And, because this glass has a small Cr content, the Cr content hardly affects the optical properties such as refractive index and dispersion, the chemical properties, the thermal properties and the mechanical properties in 400 to 700 nm which are used in a fluorescence image observation.

As a result, it is unnecessary to carry out a design change of an optical system and changes of processes such as a mechanical working process and a coating process which relate to the chemical properties, the thermal properties and the mechanical properties, and it is possible to easily replace a conventional grass for an optical system with a low fluorescent glass of the present invention.

Also, because a Sm content is particularly 3 ppm or less in an optical grass of the present invention, a glass the auto-fluorescence of which is weak can be obtained. And, because this glass has a small Sm content, the Sm content hardly affects the optical properties such as refractive index and dispersion, the chemical properties, the thermal properties and the mechanical properties in 400 to 700 nm which are used in a fluorescence image observation.

As a result, it is unnecessary to carry out a design change of an optical system and changes of processes such as a mechanical working process and a coating process which relate to the chemical properties, the thermal properties and the mechanical properties, and it is possible to easily replace a conventional grass for an optical system with a low fluorescent glass of the present invention.

BEST MODE FOR CARRYING OUT THE INVENTION

Figure 1:
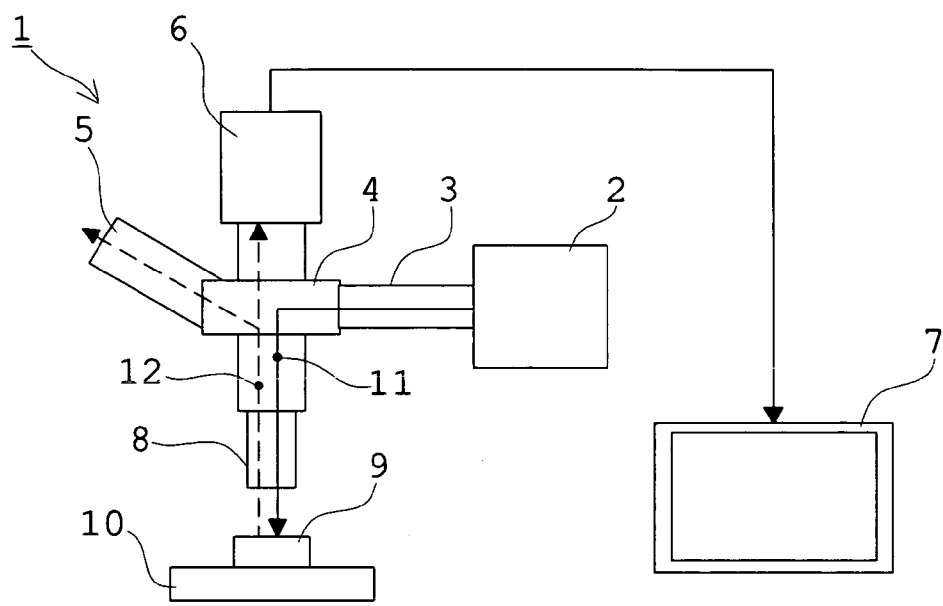
FIG. 1 is a sketchily explanatory view showing a fluorescence microscope which is one embodiment of an optical apparatus of the present invention.

As a result of making every research in order to achieve the above object, the present inventor found that it was possible to reduce auto-fluorescent light in radiation of visible light by making a Cr content of less than 5 ppm or a Sm content of 3 ppm or less in a $B_2O_3$—$La_2O_3$ based glass. In addition, the present inventor found that it was possible to reduce auto-fluorescent light in radiation of visible light by making a Sm content of 3 ppm or less.

The present invention provides a $B_2O_3$—$La_2O_3$ based optical glass containing the constituents as described above. The role of each glass constituent and the reason for the determination of the optimum content of each of the constituents will be explained below.

An optical glass of the first embodiment contains $SiO_2$, $B_2O_3$, and $La_2O_3$ as a basic glass composition.

$SiO_2$ is one of constituents which are a glass network former. The optical glass of the present embodiment contains 2-10% $SiO_2$. In the case of the content less than 2%, the chemical durability of the glass is degraded. On the other hand, in the case of the content more than 10%, the stability of the glass is impaired and a tendency to crystallization of the glass becomes pronounced.

$B_2O_3$ is one of constituents which are a glass network former. The optical glass of the present embodiment contains 5-45% $B_2O_3$. In the case of the content less than 5%, the stability and meltability of the glass are deteriorated. Also, in the case of the content more than 45%, the chemical durability is degraded.

$La_2O_3$ is a constituent for increasing the refractive index. The optical glass of the present embodiment contains 30-60% $La_2O_3$. In the case of the content less than 30%, a desired refractive index is not obtained in the present embodiment. On the other hand, in the case of the content more than 60%, the stability of the glass is impaired.

The optical glass of the second embodiment contains at least one of RO, $Ln_2O_3$, $ZrO_2$, $Nb_2O_5$, and $Ta_2O_5$, in addition to the three constituents mentioned above, as a basic glass composition.

In RO, R=Zn, Sr, Ca, or Ba, and RO indicates ZnO, SrO, CaO, or BaO. RO is a constituent for adjusting the refractive index and stability of the glass. Particularly, BaO is a constituent which considerably contributes to a high refractive index of the glass. In addition, the other constituents contribute to improvement in the stability of the glass, together with an adjustment of the refractive index of the glass. The optical glass of the present embodiment contains 0-15% RO(R=Zn, Sr, Ca, or Ba). In the case of the content more than 15%, the stability and/or chemical durability of the glass is impaired. When the optical glass of the present embodiment contains Ro, the optical glass of the present embodiment has only to contain at least one of ZnO, SrO, CaO, and BaO.

In $Ln_2O_3$, Ln=Y, or Gd, and $Ln_2O_3$ indicates $Y_2O_3$ or $Gd_2O_3$. $Y_2O_3$ and $Gd_2O_3$ are constituents for increasing the refractive index and for adjusting a dispersion value. The optical glass of the present embodiment contains 0-40% $Ln_2O_3$ (Ln=Y or Gd). In the case of the content more than 40%, the stability of the glass is impaired and the tendency to crystallization becomes pronounced. When the optical glass of the present embodiment contains $Ln_2O_3$, the optical glass of the present embodiment has only to contain at least one of $Y_2O_3$ and $Gd_2O_3$.

$ZrO_2$, $Nb_2O_5$, $TiO_2$, and $Ta_2O_5$ are constituents for increasing the refractive index and for adjusting the dispersion value. The optical glass of the present embodiment contains 0-30% $ZrO_2$+$Nb_2O_5$+$Ta_2O_5$. In the case of the content more than 30%, the meltability is deteriorated and the stability of the glass is also impaired. When the optical glass of the present embodiment contains $ZrO_2$, $Nb_2O_5$, and/or $Ta_2O_5$, the optical glass of the present embodiment has only to contain at least one of $ZrO_2$, $Nb_2O_5$, and $Ta_2O_5$.

An optical glass of the third embodiment differs from the optical glass of the first embodiment in percentage of each of the constituents. That is to say, the optical glass contains 2-20% $SiO_2$, 5-45% $B_2O_3$, and 10-29% $La_2O_3$. In the optical glass of the third embodiment, the upper limit value of a $SiO_2$ content is 20% and is larger than that of the optical glass of the first embodiment. On the other hand, a $La_2O_3$ content is 10-29% in the third embodiment and is smaller than that of the optical glass of the first embodiment.

Also, an optical glass of the fourth embodiment contains at least one of RO, $Ln_2O_3$, $ZrO_2$, $Nb_2O_5$, $TiO_2$, and $Ta_2O_5$, in addition to the three constituents mentioned above in the third embodiment, as a basic glass composition. That is to say, the optical glass of the fourth embodiment contains 0-45% RO(R=Zn, Sr, Ca, or Ba), 0-10% $Ln_2O_3$ (Ln=Y, or Gd), and 1-20% $ZrO_2$+$Nb_2O_5$+$TiO_2$, +$Ta_2O_5$. The optical glass of the fourth embodiment may not contain RO and $Ln_2O_3$.

Also, an optical glass of the fifth embodiment contains $Al_2O_3$, in addition to the three constituents in the fourth embodiment, as a basic glass composition. In addition, the optical glass of the fifth embodiment contains RO and at least one of $ZrO_2$, $Nb_2O_5$, $TiO_2$, and $Ta_2O_5$. That is to say, the optical glass of the fifth embodiment contains 0.1-5% $Al_2O_3$, 1-60% RO(R=Zn, Sr, Ca, or Ba), and 1-10% $ZrO_2$+$Nb_2O_5$+$TiO_2$, +$Ta_2O_5$. Also, the optical glass of the fifth embodiment contains 0-10% $Ln_2O_3$ (Ln=Y, or Gd) or may not contain $Ln_2O_3$.

$Al_2O_3$ is a constituent for adjusting the viscosity and weatherability of the glass in addition to adjusting the refractive index of the glass. In the case of the content more than 5%, the stability and meltability of the glass are deteriorated.

The function of each of the other constituents, or the like, is explained as in the first and second embodiments.

A Cr content is less than 5 ppm or a Sm content is 3 ppm or less with respect to the 100% basic glass compositions described above in the optical glasses of the first to fifth embodiments.

Cr is a constituent emitting auto-fluorescent light. Cr emits fluorescent light having a peak wavelength of 545 nm and auto-fluorescent light having a peak wavelength in the vicinity of 700 nm. Particularly, the latter auto-fluorescent light is widely observed in the region of wavelengths which are 650 nm or more, and the auto-fluorescence is highly sensitive to the Cr content. As a result, Cr is a constituent which causes an obstacle to highly accurate fluorescence observation and measurement in the near infrared region. If a Cr content is beyond 5 ppm, it is impossible to achieve the object of the present invention. Accordingly, it is preferred that a Cr content is less than 5 ppm. It is particularly preferred that a Cr content is 2 ppm or less.

Figure 4:
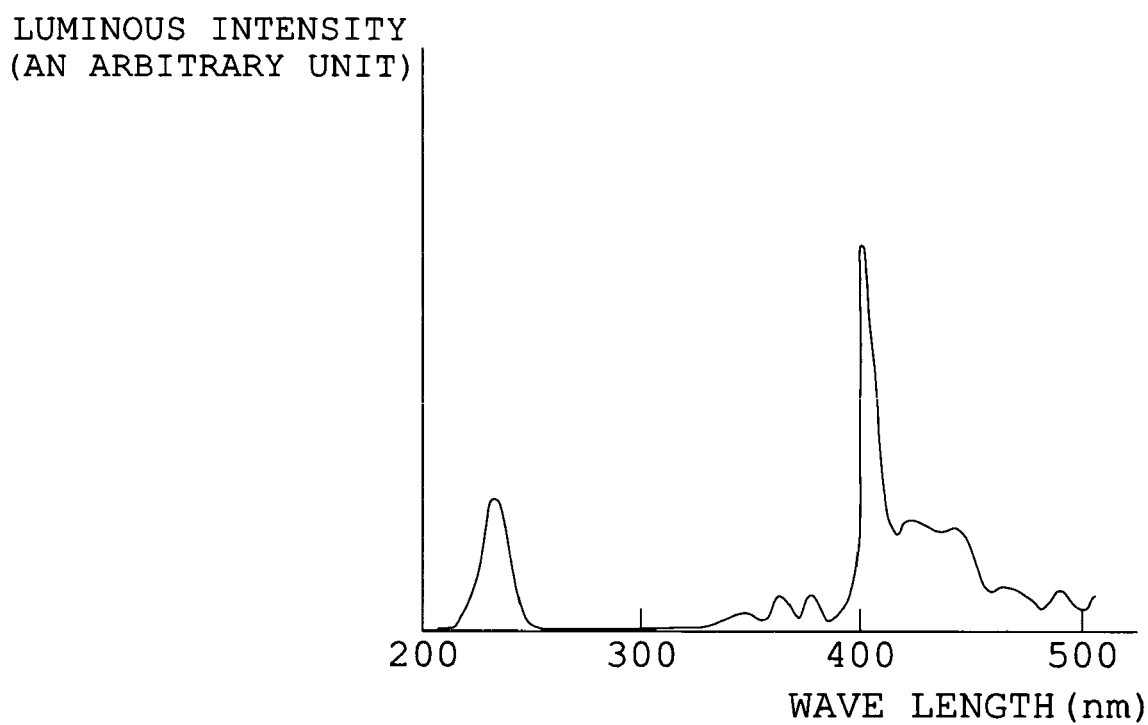
FIG. 4 is a view showing the excitation spectrum of an excitation wavelength in Sm.
Figure 5:
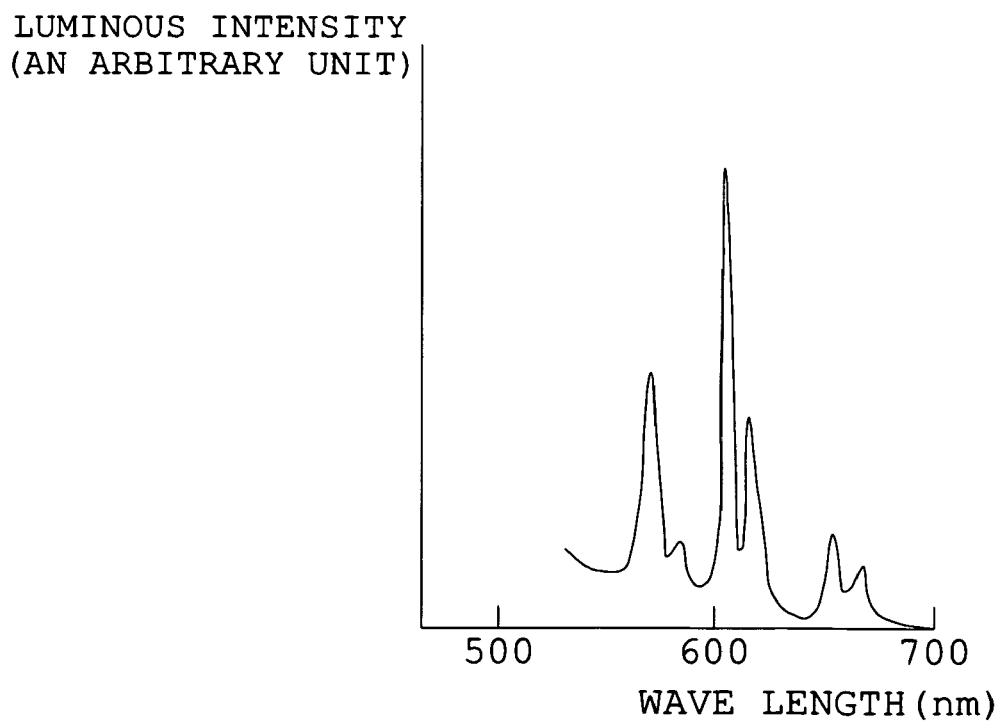
FIG. 5 is a view showing the fluorescence spectrum of an emission wavelength in Sm.

Sm is a constituent emitting auto-fluorescent light in radiation of light from ultraviolet region to visible region (200-500 nm). FIGS. 4 and 5 show the excitation spectrum and the fluorescence spectrum of Sm, respectively. In this case, FIG. 4 shows the excitation spectrum and FIG. 5 shows the fluorescence spectrum.

FIG. 4 is a view in which a fluorescence intensity of the fluorescence wavelength of 610 nm is plotted as an excitation wavelength is made to vary from 200 nm to 500 nm. For example, the fluorescence intensity in 610 nm is at a maximum when excitation light of 405 nm is radiated. On the other hand, FIG. 5 is a view in which a fluorescence intensity is shown per wavelength (550-700 nm) when an excitation wavelength is 405 nm. When one of wavelengths from 200 to 500 nm is selected as an excitation wavelength, excitation light with the excitation wavelength has a intensity proportional to the excitation spectrum shown in FIG. 4, and the excitation light causes fluorescent light which has a spectral shape which is similar to the fluorescent spectrum shown in FIG. 5.

As shown in FIG. 4, when light of 200-500 nm is radiated, Sm emits auto-fluorescent light of 550-700 nm. As a result, for example, when a fluorescent wavelength of a specimen is 550-700 nm, auto-fluorescent light generated by Sm is added to fluorescent light generated by the specimen. In this case, it is impossible to acquire a fluorescent image of the specimen with good contrast. If an amount of Sm which is contained in the glass is beyond 3 ppm, the auto-fluorescence has a bad influence on contrast of a fluorescent image. That is to say, if an amount of Sm which is contained in the glass is beyond 3 ppm, it is impossible to acquire an optical glass in which the auto-fluorescence intensity is reduced.

Next, an optical glass of the sixth embodiment is described. The optical glass of the sixth embodiment contains as a defoaming agent one or more of $Sb_2O_3$, chloride, sulfide, and fluoride, where the one or more of $Sb_2O_3$, chloride, sulfide, and fluoride are added to one of the optical glasses of the first to fifth embodiments and the content of one or more of the constituents is 0.01 to 1%. Such a manner makes it possible to decrease foam which is caused by raw materials resolving and/or reacting in melting a glass. In the case of the content less than 0.01%, it is impossible to acquire a deforming effect. On the other hand, the content the more than 1% causes a problem that auto-fluorescent light increases.

Next, an optical glass of the seventh embodiment is described. The optical glass of the seventh embodiment contains at least one or more of $Li_2O$, $Na_2O$, $K_2O$, $Rb_2O$, and $Cs_2O$ which are an alkaline metal oxide, where the one or more of these alkaline metal oxides are added to one of the optical glasses of the first to sixth embodiments and the content of the one or more of the constituents is 0 to 10%. Such a manner makes it possible to improve the meltability of the glass. In the case of the content more than 10%, the chemical durability and the stability of the glass are degraded. Besides, it is preferred that the optical glass contains more than one alkaline metal oxide.

Also, the optical glass of the present embodiment can contain another constituent for the purpose of improvements on the defoaming ability, meltability, and/or stability and so on.

Subsequently, a fluorescence observation measurement apparatus of the present invention will be explained.

An optical apparatus of the present invention refers to, for example, a fluorescence microscope, a living cell observation apparatus, a gene analysis apparatus, a photoluminescence measurement apparatus, a fluorescence spectrophotometer, a fluorescence life measurement apparatus, a plasma display panel examination apparatus, an endoscope having a fluorescence observation function, or the like. In any case, an optical apparatus of the present invention is an apparatus for observing or measuring fluorescent light.

These optical apparatuses are an apparatus for observing and/or measuring fluorescent light emanating from a specimen. In order to make a specimen emit fluorescent light, excitation light emanating from a light source is radiated to the specimen through an optical system. By the irradiation of excitation light, the specimen emits fluorescent light. The fluorescent light is detected by a photodetector (such as a photodiode, photomultiplier tube, CCD, or CMOS), through an optical system.

The optical system mentioned above contains optical parts, such as a lens, a prism, a mirror, a filter, etc., which are made of optical glass. The use of the optical glass of the present embodiment for each of these optical parts makes it possible to lower the intensity (the amount of light) of auto-fluorescent light emanating from each of the optical parts. As a result, in a fluorescence observation, a decrease in contrast of a fluorescent image can be suppressed. Moreover, in a fluorescence measurement, a noise component (auto-fluorescent light) in a fluorescence signal can be reduced.

Embodiment 1

Subsequently, the optical glass of the embodiment 1 is shown as Test examples 1-20 in Table 1. In the embodiment 1, twenty kinds of glass examples are prepared and an amount of fluorescent light of each of the glass examples is measured.

Besides, each of compositions shown in Table 1 is expressed by percentage by weight.

A glass material which is used for the optical glass of the present embodiment is a high-grade glass material in which an amount of mixed impurities is small. After this glass material is mixed so as to obtain a preset ratio, the mixed materials are melted at 1100-1400° C. in a platinum crucible for 2-5 hours and are annealed. The glass prepared in this way is worked into a square pillar of 11×11×40 mm, four faces (faces of 11×40 mm) in a longitudinal direction are finished by mirror polishing, and an optical glass are obtained.

This optical glass is used and the fluorescence intensity is measured by the fluorescence spectrophotometer (FP-6500, made by JASCO Corporation). In the measurement, light of 480 nm is radiated to the optical glass of each of the embodiments to measure the fluorescence intensity in wavelengths of 530-650 nm. The value (an arbitrary unit) acquired by integrating the fluorescence intensity in the wavelengths of 530-650 nm is taken as auto-fluorescence intensity, and is compared with the auto-fluorescence intensity of a commercial $B_2O_3$—$La_2O_3$ based glass which is arbitrarily selected, in order to evaluate the optical glass. In evaluation, the auto-fluorescence intensity of the commercial glass is regarded as an evaluation criterion, the ratio of the auto-fluorescence intensity of each of the test examples in Table 1 to the auto-fluorescence intensity of the commercial glass is found, and a fluorescence degree is defined by the ratio. A fluorescence degree which is less than 0.7 is ranked as A, a fluorescence degree which is 0.7-1.5 is ranked as B, and a fluorescence degree which is 1.5 or more is ranked as C.

Also, Table 2 shows results of evaluations of fluorescence degree on the basis of the results of measurements of auto-fluorescence intensity which are made in the same way with respect to two commercial optical glasses (, where Cr contents are not measured in the two commercial glasses), as a comparative example. Optics cal glasses of the commercial glasses 1 and 2 are a commercial $B_2O_3$—$La_2O_3$ based glass which differs from the above-described $B_2O_3$—$La_2O_3$ based glass for the evaluation criterion.

In order to achieve the object of the present invention, it is desired that the index of a fluorescence degree is A.

These results confirm that the auto-fluorescence intensities are reduced more in the optical glasses of the present embodiment as compared with the optical glasses of the comparative examples.

Besides, the correspondences between the test examples and the embodiments are as shown below.

First embodiment: Test examples 1-10

Second embodiment: Test examples 1-10

Third embodiment: Test examples 11-20

Fourth embodiment: Test examples 12, and 14-20

Fifth embodiment: Test examples 18 and 20

Sixth embodiment: Test examples 3, 4, 8-10, 14-16, 19 and 20

Seventh embodiment: Test examples 1-20

TABLE 1

| | Test example/weight % | | | | | | | | | |
|---|---|---|---|---|---|---|---|---|---|---|
| | 1 | 2 | 3 | 4 | 5 | 6 | 7 | 8 | 9 | 10 |
| $SiO_2$ | 3.0 | 3.5 | 7.0 | 10.0 | 8.0 | 2.0 | 6.5 | 2.0 | 5.5 | 8.0 |
| $B_2O_3$ | 35.0 | 30.0 | 35.0 | 35.0 | 10.5 | 43.0 | 37.0 | 45.0 | 31.0 | 21.0 |
| $La_2O_3$ | 43.5 | 45.0 | 40.0 | 34.0 | 40.0 | 44.0 | 36.0 | 31.0 | 42.0 | 50.0 |
| ZnO | 2.0 | 2.0 | | 1.0 | 2.5 | 1.0 | 2.0 | 2.5 | 8.0 | 2.0 |
| SrO | | 1.0 | | | | 1.0 | 1.0 | 2.5 | 1.0 | 1.0 |
| BaO | | | 1.0 | | | | | | 2.0 | 1.0 |
| CaO | | | | 2.0 | | | 1.0 | | | |
| $Y_2O_3$ | 9.5 | 9.5 | 10.0 | 15.0 | | 5.0 | 7.0 | 2.0 | 7.5 | 8.0 |
| $Gd_2O_3$ | | | | | 16.0 | | | 9.0 | | |
| $ZrO_2$ | 7.0 | 7.0 | 5.0 | 3.0 | 5.5 | 2.0 | | 4.0 | | 6.0 |
| $TiO_2$ | | | | | | | | | | |
| $Nb_2O_5$ | | 2.0 | | 1.0 | 1.0 | | 1.5 | | 3.0 | 3.0 |
| $Ta_2O_5$ | | | | | 17.0 | | | | | |
| $Al_2O_3$ | | | | | | | | | | |
| $Sb_2O_3$ | | | | 0.05 | | | | | | 0.02 |
| NaCl | | | 0.05 | | | | | | | |
| $Na_2SO_4$ | | | | | | | | | 0.1 | |
| NaF | | | | | | | | | 0.05 | |
| $Li_2O$ | | | 0.1 | 0.1 | | | | 1.0 | | |
| $Na_2O$ | | 1.0 | | 1.0 | | | 3.0 | | | |
| $K_2O$ | | 1.0 | | | | | 5.0 | | | |
| $Rb_2O$ | | | | | | 1.0 | | | | |
| $Cs_2O$ | | | | | | 1.0 | | 1.0 | | |
| Cr/ppm | 4.9 | 4.0 | 3.0 | 1.0 | 2.0 | 3.5 | 4.5 | 2.5 | 0.5 | 1.5 |
| Fluorescence degree | A | A | A | A | A | A | A | A | A | A |

| | Test example/weight % | | | | | | | | | |
|---|---|---|---|---|---|---|---|---|---|---|
| | 11 | 12 | 13 | 14 | 15 | 16 | 17 | 18 | 19 | 20 |
| $SiO_2$ | 14.0 | 4.5 | 10.0 | 7.0 | 12.0 | 6.0 | 16.5 | 12.5 | 5.0 | 18.0 |
| $B_2O_3$ | 11.0 | 35.0 | 24.0 | 37.0 | 29.0 | 33.0 | 18.0 | 32.0 | 22.0 | 40.0 |
| $La_2O_3$ | 19.5 | 18.5 | 20.0 | 14.0 | 12.0 | 11.0 | 20.0 | 17.0 | 10.5 | 13.0 |
| ZnO | 8.0 | 11.5 | | | | 6.0 | | 13.0 | 3.0 | |
| SrO | | 4.0 | | 17.3 | | | | | 5.0 | |
| BaO | 40.0 | 5.0 | | | 20.0 | 22.9 | 43.0 | 7.5 | 30.0 | 20.0 |
| CaO | | | 18.5 | | 5.0 | 10.0 | | 12.0 | | |
| $Y_2O_3$ | | 5.0 | | | 8.0 | | | | 4.0 | |
| $Gd_2O_3$ | | | | 6.0 | | 3.0 | | | | |
| $ZrO_2$ | 3.5 | 5.0 | 6.0 | 2.5 | 4.0 | 4.0 | 2.5 | 5.0 | 3.3 | 2.5 |
| $TiO_2$ | 4.0 | 2.5 | 13.0 | 10.0 | 5.0 | | | | 8.0 | |
| $Nb_2O_5$ | | | 8.5 | | 4.5 | | | | | 2.0 |
| $Ta_2O_5$ | | 4.0 | | 3.5 | | | | | 3.5 | |
| $Al_2O_3$ | | | | | | | | 1.0 | | 2.0 |
| $Sb_2O_3$ | | | | 0.2 | | 0.1 | | | | |
| NaCl | | | | | | | | | 0.7 | |
| $Na_2SO_4$ | | | | | 0.5 | | | | | |
| NaF | | | | | | | | | | 0.5 |
| $Li_2O$ | | | | 2.0 | | | | | | |
| $Na_2O$ | | 2.5 | | | | 3.0 | | | 2.5 | |
| $K_2O$ | | 2.5 | | | | | | | 2.5 | |
| $Rb_2O$ | | | | | | | 1.0 | | | |
| $Cs_2O$ | | | | 1.0 | | | | | | 2.0 |
| Cr/ppm | 3.0 | 4.9 | 2.0 | 0.5 | 1.0 | 3.0 | 2.0 | 4.9 | 1.0 | 4.0 |
| Fluorescence degree | A | A | A | A | A | A | A | A | A | A |

TABLE 2

| | Comparative example | |
|---|---|---|
| | The commercial glass 1 | The commercial glass 2 |
| Fluorescent degree | B | B |

Embodiment 2

Subsequently, one embodiment of an optical apparatus of the present invention will be explained in accordance with FIG. 1. FIG. 1 is an explanatory view showing schematically a fluorescence microscope 1 which is an optical apparatus of the present invention. The fluorescence microscope 1 comprises an excitation light source section 2, an excitation light optical system 3, a filter section 4, an ocular optical system 5, an image capturing section 6, a display device 7, an objective lens 8, and a specimen stand 10: Also, reference numeral 9 represents a specimen (a sample).

The excitation light source section 2 is provided with a xenon lamp emitting excitation light 11 and a power source device which is not shown in the drawings. The excitation light optical system 3 is an optical system which conducts the excitation light 11 to the specimen 9, and the excitation light optical system 3 is arranged between the excitation light source section 2 and the filter section 4. The filter section 4 is constructed with a dielectric multilayer film filter. The filter section 4 comprises a band-pass filter and a dichroic mirror. The dichroic mirror has properties of reflecting the excitation light 11 and of transmitting fluorescent light 12.

The ocular optical system 5 is an optical system for observing the image (the fluorescent image) of the specimen 9 with a naked eye. The image capturing section 6 is a CCD camera capturing the image of the fluorescent light 12. The display device 7 displays the captured image of the fluorescent light 12. The objective lens 8 focuses the excitation light 11 on the specimen 9 and focuses the fluorescent light 12 on a preset position to form an image. The specimen stand 10 is used for placing the specimen 9 thereon.

Light emitted from the excitation light source section 2 passes through the excitation light optical system 3 and is incident on the filter section 4. A band-pass filter is arranged in the filter section 4, and the band-pass filter transmits light of wavelengths of 460-495 nm. Hence, the light emitted from the excitation light source section 2 passes through the filter section 4 and thereby the light of wavelengths of 460-495 nm, or the excitation light 11, is obtained.

Next, the excitation light 11 is incident on the dichroic mirror. The dichroic mirror has properties of reflecting light of wavelengths of less than 505 nm and of transmitting light of wavelength of more than 505 nm. The dichroic mirror is provided at an angle of 45 degrees to the traveling direction of the excitation light 11. As a result, the excitation light 11 incident on the dichroic mirror is bent at an angle of 90 degrees and is led to the objective lens 8.

The excitation light 11 is collected by the objective lens 8 to be radiated to the specimen 9 which is provided on the specimen stand 10. The excitation light 11 is absorbed by the specimen 9 (a fluorescent material), and the fluorescent light 12 emanates from the specimen 9.

The fluorescent light 12 is collected by the objective lens 8. The fluorescent light 12 thus collected is incident on the dichroic mirror of the filter section 4. Here, the wavelength of the fluorescent light 12 is longer than 505 nm. Consequently, the fluorescent light 12 is transmitted through the dichroic mirror. Further, the fluorescent light 12, after passing through a filter transmitting light of wavelength longer than 510 nm, is focused on a preset position to form a fluorescent image. And, the image of this fluorescent light is observed by the ocular optical system 5.

Also, the fluorescence microscope 1 may be provided with an optical path switching mechanism (not shown in the drawings). The optical path is switched by the optical path switching mechanism and thereby the fluorescent light 12 can be led to the image capturing section 6. In this way, a fluorescent image can be captured by the image capturing section 6. The fluorescent image thus captured is displayed on the display device 7.

In the present embodiment, auto-fluorescent light which becomes a noise occurs in the filter section 4 and the objective lens 8. In the present embodiment, an optical glass of Embodiment 1 (one of the optical glasses of the Test examples 1-20) is used for a part of optical lenses used in the objective lens 8. Whereby, auto-fluorescence light occurring in the objective lens 8 can be reduced. As a result, the contrast of the fluorescent image is increased and a sharp fluorescent image can be obtained.

Embodiment 3

Figure 2:
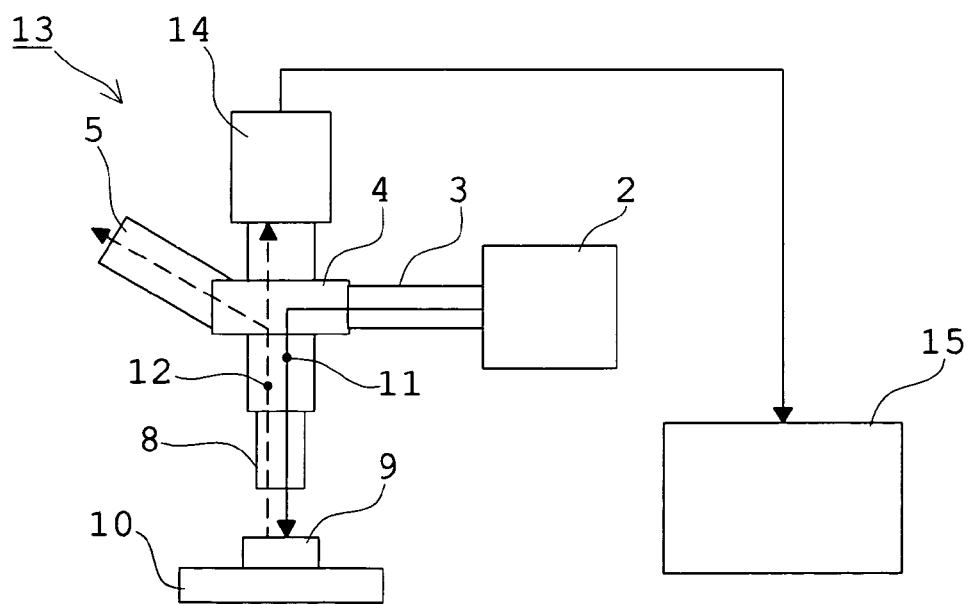
FIG. 2 is a sketchily explanatory view showing a fluorescence microscope of the present invention.

Subsequently, another embodiment of the optical apparatus of the present invention will be explained in accordance with FIG. 2. FIG. 2 is an explanatory view showing schematically a fluorescence microscope 13 which is an optical apparatus of the present invention. The fluorescence microscope 13 has no difference from the fluorescence microscope 1 shown in FIG. 1 with the exception that the image capturing section 6 is replaced with a photodetector section 14, and thus its detailed description is omitted. Besides, the photodetector section 14 is provided with a photomultiplier tube measuring the intensity of the fluorescent light 12 and with a power device which is not shown in the drawings.

The fluorescent light 12 is transmitted through the dichroic mirror of the filter section 4 and passes through the filter transmitting light of wavelength longer than 420 nm. And, the fluorescent light 12 is then incident on the photodetector section 14. In the photodetector section 14, the intensity of the light (the fluorescent light intensity) is measured as a current value, and the value is displayed on a display device 15.

In this case, auto-fluorescent light which becomes noise occurs in the filter section 4 and the objective lens 8. Here, when measurement of fluorescent light intensity is carried out without placing the specimen 9 on the specimen stand 10, auto-fluorescent light occurring in the filter section 4 and the objective lens 8 is measured.

In the present embodiment, an optical glass of Embodiment 1 is used for a part of glasses which are used for the objective lens 8. And, measurement of fluorescent light intensity was done without placing the specimen on the specimen stand 10. In addition, the objective lens 8 using a conventional optical glass was used to make measurement of fluorescent light intensity.

As a result, in the case of the objective lens 8 using the optical glass of Embodiment 1, the measured value of the fluorescent light intensity (an arbitrary unit) is 63. In contrast to this, the measured value of the fluorescent light intensity (an arbitrary unit) is 260 in the case of the objective lens 8 using the conventional optical glass. In this way, the intensity of the auto-fluorescent light is reduced to about ¼ in the optical glass of Embodiment 1, as compared with the conventional one. Hence, it is possible to make background noise smaller in the fluorescence microscope of the present embodiment than in the fluorescence microscope of the prior art.

Embodiment 4

Figure 3:
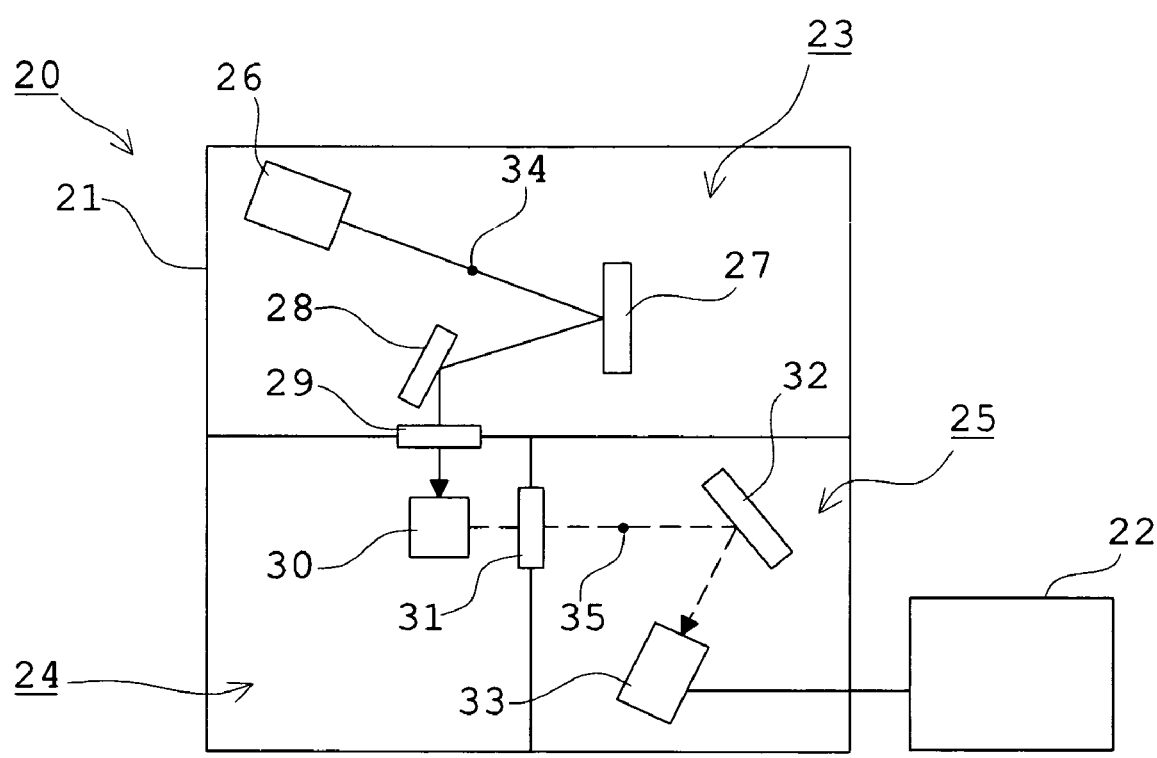
FIG. 3 is an explanatory view showing the constituent of a fluorescence spectrophotometer of the present invention.

Subsequently, still another embodiment of an optical apparatus of the present invention will be explained in accordance with FIG. 3. FIG. 3 is an explanatory view showing the formation of a fluorescence spectrophotometer 20 which is the optical apparatus of the present invention. The fluorescence spectrophotometer 20 comprises a photometer 21, a control and/or analysis section 22, and a power source which is not shown in the drawings.

The photometer 21 radiates excitation light 34 to a specimen and converts fluorescent light 35 emanating from the specimen into intensity signals. The control and/or analysis section 22 performs control of the photometer 21 and performs a display and/or an analysis of the measured intensity of the fluorescent light.

The photometer 21 comprises an excitation light optical system 23, a specimen chamber 24, and a fluorescence optical system 25. The excitation light optical system 23 comprises a xenon lamp 26 emitting the excitation light 34, an excitation light diffraction grating 27 splitting the excitation light 34 into a spectrum, a mirror 28 changing the direction of the excitation light 34 toward the specimen, and an excitation light exit window 29 spatially dividing the excitation light optical system 23 form the specimen chamber 24. A low fluorescent optical glass of Embodiment 1 is used for the excitation light exit window 29.

The reason for spatially dividing the excitation light optical system 23 from the specimen chamber 24 is to prevent the contamination of the excitation light optical system 23 caused by the penetration of a foreign matter from the specimen chamber 24. For the same reason, also in the fluorescence optical system 25 described later, a fluorescence entrance window 31 spatially divides the fluorescence optical system 25 from the specimen chamber 24.

The fluorescence optical system 25 comprises the light entrance window 31, a fluorescence diffraction grating 32, and a photomultiplier tube 33. The light entrance window 31 is provided at the position where the fluorescent light 35 emanating from a specimen 30 is incident on the fluorescence optical system 25. The fluorescence diffraction grating 32 splits the incident fluorescent light 35 into a spectrum. The photomultiplier tube 33 converts the intensity of the split fluorescent light into electric current. Here, an optical glass of Embodiment 1 is used for the fluorescence entrance window 31.

Next, the measurement of fluorescent light with the fluorescence spectrophotometer 20 will be explained. The specimen 30 the fluorescent light of which is measured is placed in the specimen chamber 24. The excitation light 34 emanating from the xenon lamp 26 is split into a spectrum by the excitation light diffraction grating 27 to form, for example, light with a center wavelength of 480 nm and a wavelength width of 10 nm. This excitation light is reflected by the mirror 28, passes through the excitation light exit window 29, and enters the specimen chamber 24 to be radiated to the specimen 30.

In the excitation light 34 which is radiated to the specimen 30, part of the excitation light 34 is absorbed by the specimen 30 and the fluorescent light is made to emanate from the specimen 30 by the energy of the absorbed excitation light 34. The fluorescent light 35 emanating from the specimen 30 passes through the fluorescence entrance window 31 and enters the fluorescence optical system 25. The fluorescent light 35 is split into a spectrum by the fluorescence diffraction grating 32 (for example, wavelength 600 nm). In splitting the fluorescent light 35 into a spectrum, the fluorescence diffraction grating 32 is operated to change the angle of incidence of the fluorescent light 35 to the fluorescence diffraction grating 32. In this way, the wavelength of the light incident on the photomultiplier tube 33 is changed.

Light into which the fluorescence diffraction grating 32 split the fluorescent light 35 is incident on the photomultiplier tube 33 so that the intensity of the light is converted into electric current. The intensity of the light converted into electric current by the photomultiplier tube 33 is displayed and/or analyzed by the control and/or analysis section 22. When the data of the intensity of the fluorescent light are collected per wavelength, the fluorescent light spectrum expressing the intensity of the fluorescent light with respect to the wavelengths of the fluorescent light is obtained.

In a fluorescence spectrophotometer of the prior art, auto-fluorescent light occurs in the excitation light exit window 29 through which the excitation light 34 is radiated. In addition, the scattered light of the excitation light 34 which is radiated to the specimen 30 is incident on the excitation light exit window 29 and the fluorescence entrance window 31 to cause auto-fluorescence light. Such auto-fluorescent light increases the value of the background in measurement and brings about difficulty in measurement requiring a high degree of accuracy, such as measurement of the feeble intensity of fluorescent light.

In contrast to this, in the fluorescence spectrophotometer 20 according to the present embodiment, an optical glass of Embodiment 1 is used for the excitation light exit window 29 and the fluorescence entrance window 31. Whereby, it is possible to make a small intensity of auto-fluorescence light occurring from these windows. Hence, it is possible to lower the value of the background of measurement. Consequently, even though fluorescent light has a feeble intensity, it is possible to make measurement of the fluorescent light with a high degree of accuracy.

Embodiment 5

Subsequently, the optical glass of the embodiment 5 is shown as the Test examples 1-20 in Table 3. In the embodiment 5, twenty kinds of glass examples are prepared and an amount of fluorescent light of each of the glass examples was measured. Besides, each of the compositions shown in Table 3 is expressed by percentage by weight.

A high-grade glass material in which an amount of mixed impurities is small is used for the optical glass of the present embodiment. After this glass material is mixed so as to obtain a preset ratio, the mixed materials are melted at 1100-1400° C. in a platinum crucible for 2-5 hours and are annealed. The glass prepared in this way is worked into a square pillar of 11×11×40 mm, four faces (faces of 11×40 mm) in a longitudinal direction are finished by mirror polishing, and an optical glass is obtained.

This optical glass is used and the fluorescence intensity is measured by the fluorescence spectrophotometer (FP-6500, made by JASCO Corporation). In the measurement, light of 480 nm is radiated to the optical glass of each of the embodiments to measure the fluorescence intensity in wavelengths of 500-700 nm. And, the value (an arbitrary unit) acquired by integrating the fluorescence intensity in wavelengths of 500-700 nm is taken as auto-fluorescence intensity, and is compared with the auto-fluorescence intensity of a commercial $B_2O_3$—$La_2O_3$ based glass which is arbitrarily selected, in order to evaluate the optical glass. In evaluation, the auto-fluorescence intensity of the commercial glass is regarded as an evaluation criterion, the ratio of the auto-fluorescence intensity of each of the test examples in Table 3 to the auto-fluorescence intensity of the commercial glass is found, and a fluorescence degree is defined by the ratio. A fluorescence degree which is less than 0.7 is ranked as A, a fluorescence degree which is 0.7-1.5 is ranked as B, and a fluorescence degree which is 1.5 or more is ranked as C.

Also, Table 4 shows results of evaluations of fluorescence degree on the basis of the results of measurements of auto-fluorescence intensity which is made in the same way with respect to three commercial optical glasses (, where a Sm content is not measured in the three commercial optical glasses), as a comparative example. Optical glasses of the commercial glasses 1 to 3 are a commercial $B_2O_3$—$La_2O_3$ based glass which differs from the above-described $B_2O_3$—$La_2O_3$ based glass for the evaluation criterion.

In order to achieve the object of the present invention, it is desired that the index of a fluorescence degree is A.

These results confirm that the auto-fluorescence intensities are reduced more in the optical glasses of the present embodiment as compared with the optical glasses of the comparative examples.

TABLE 3

| | Test example/weight % | | | | | | | | | |
|---|---|---|---|---|---|---|---|---|---|---|
| | 1 | 2 | 3 | 4 | 5 | 6 | 7 | 8 | 9 | 10 |
| $SiO_2$ | 3.0 | 3.5 | 7.0 | 10.0 | 8.0 | 2.0 | 6.5 | 2.0 | 5.5 | 8.0 |
| $B_2O_3$ | 35.0 | 30.0 | 35.0 | 35.0 | 10.5 | 43.0 | 37.0 | 45.0 | 31.0 | 21.0 |
| $La_2O_3$ | 43.5 | 45.0 | 40.0 | 34.0 | 40.0 | 44.0 | 36.0 | 31.0 | 42.0 | 50.0 |
| ZnO | 2.0 | 2.0 | | 1.0 | 2.5 | 1.0 | 2.0 | 2.5 | 8.0 | 2.0 |
| SrO | | 1.0 | | | | 1.0 | 1.0 | 2.5 | 1.0 | 1.0 |
| BaO | | | 1.0 | | | | | | 2.0 | 1.0 |
| CaO | | | | 2.0 | | | 1.0 | | | |
| $Y_2O_3$ | 9.5 | 9.5 | 10.0 | 15.0 | | 5.0 | 7.0 | 2.0 | 7.5 | 8.0 |
| $Gd_2O_3$ | | | | | 16.0 | | | 9.0 | | |
| $ZrO_2$ | 7.0 | 7.0 | 5.0 | 3.0 | 5.5 | 2.0 | | 4.0 | | 6.0 |
| $TiO_2$ | | | | | | | | | | |
| $Nb_2O_5$ | | 2.0 | | 1.0 | 1.0 | | 1.5 | | 3.0 | 3.0 |
| $Ta_2O_5$ | | | | | 17.0 | | | | | |
| $Al_2O_3$ | | | | | | | | | | |
| $Sb_2O_3$ | | | | 0.05 | | | | | | 0.02 |
| NaCl | | | 0.05 | | | | | | | |
| $Na_2SO_4$ | | | | | | | | 0.1 | | |
| NaF | | | | | | | | | 0.05 | |
| $Li_2O$ | | | 0.1 | 0.1 | | | | 1.0 | | |
| $Na_2O$ | | 1.0 | | 1.0 | | | 3.0 | | | |
| $K_2O$ | | 1.0 | | | | | 5.0 | | | |
| $Rb_2O$ | | | | | | 1.0 | | | | |
| $Cs_2O$ | | | | | | 1.0 | | 1.0 | | |
| Sm/ppm | 3.0 | 3.0 | 3.0 | 2.5 | 2.5 | 2.0 | 2.0 | 1.0 | 1.0 | 0.5 |
| Fluorescence degree | A | A | A | A | A | A | A | A | A | A |

| | Test example/weight % | | | | | | | | | |
|---|---|---|---|---|---|---|---|---|---|---|
| | 11 | 12 | 13 | 14 | 15 | 16 | 17 | 18 | 19 | 20 |
| $SiO_2$ | 14.0 | 4.5 | 10.0 | 7.0 | 12.0 | 6.0 | 16.5 | 12.5 | 5.0 | 18.0 |
| $B_2O_3$ | 11.0 | 35.0 | 24.0 | 37.0 | 29.0 | 33.0 | 18.0 | 32.0 | 22.0 | 40.0 |
| $La_2O_3$ | 19.5 | 18.5 | 20.0 | 14.0 | 12.0 | 11.0 | 20.0 | 17.0 | 10.5 | 13.0 |
| ZnO | 8.0 | 11.5 | | | | 6.0 | | 13.0 | 3.0 | |
| SrO | | 4.0 | | 17.3 | | | | | 5.0 | |
| BaO | 40.0 | 5.0 | | | 20.0 | 22.9 | 43.0 | 7.5 | 30.0 | 20.0 |
| CaO | | | 18.5 | | 5.0 | 10.0 | | 12.0 | | |
| $Y_2O_3$ | | 5.0 | | | 8.0 | | | | 4.0 | |
| $Gd_2O_3$ | | | | 6.0 | | 3.0 | | | | |
| $ZrO_2$ | 3.5 | 5.0 | 6.0 | 2.5 | 4.0 | 4.0 | 2.5 | 5.0 | 3.3 | 2.5 |
| $TiO_2$ | 4.0 | 2.5 | 13.0 | 10.0 | 5.0 | | | | 8.0 | |
| $Nb_2O_5$ | | | 8.5 | | 4.5 | | | | | 2.0 |
| $Ta_2O_5$ | | 4.0 | | 3.5 | | | | | 3.5 | |
| $Al_2O_3$ | | | | | | | | 1.0 | | 2.0 |
| $Sb_2O_3$ | | | | 0.2 | | 0.1 | | | | |
| NaCl | | | | | | | | | 0.7 | |
| $Na_2SO_4$ | | | | | 0.5 | | | | | |
| NaF | | | | | | | | | | 0.5 |
| $Li_2O$ | | | | 2.0 | | | | | | |
| $Na_2O$ | | 2.5 | | | | 3.0 | | | 2.5 | |
| $K_2O$ | | 2.5 | | | | | | | 2.5 | |
| $Rb_2O$ | | | | | | | 1.0 | | | |
| $Cs_2O$ | | | 1.0 | | | | | | | 2.0 |
| Sm/ppm | 3.0 | 2.5 | 2.0 | 1.0 | 0.5 | 3.0 | 2.5 | 2.0 | 1.0 | 0.5 |
| Fluorescence degree | A | A | A | A | A | A | A | A | A | A |

TABLE 4

| | Comparative example | | |
|---|---|---|---|
| | The commercial glass 1 | The commercial glass 2 | The commercial glass 3 |
| Fluorescent degree | B | C | B |

Embodiment 6

Because the constitution and operation effect of the present embodiment are the same as those of the embodiment which are explained by referring to FIG. 1, respectively, the explanations of the constitution and operation effect of the present embodiment are omitted. In the present embodiment, an optical glass of the Embodiment 5 (one of optical glasses of the test examples 1-20) is used in a part of optical lenses used for the objective lens 8, and whereby, it is possible to reduce auto-fluorescent light occurring in the objective lens 8. As a result, the contrast of a fluorescent image increases and it is possible to obtain a sharp fluorescent image.

Embodiment 7

Because the constitution and operation effect of the present embodiment are the same as those of the embodiment which are explained by referring to FIG. 2, respectively, the explanations of the constitution and operation effect of the present embodiment are omitted. In the present embodiment, an optical glass of the Embodiment 5 is used in a part of glasses which are used for the objective lens 8. And, auto-fluorescence intensity was measured without placing a specimen on the specimen stand 10. Also, auto-fluorescence intensity was measured in an objective lens 8 in which a conventional optical glass is used.

As a result, in the case of the objective lens 8 in which the optical glass of the Embodiment 5 is used, the measurement value of the auto-fluorescence intensity (an arbitrary unit) is 1.4. In contrast to the case, the measurement value of the auto-fluorescence intensity (an arbitrary unit) is 3.0 in the case of the objective lens 8 in which the conventional optical glass is used. Thus, the auto-fluorescence intensity of the optical grass of the Embodiment 5 is about ½ of that of the conventional optical glass, as compared with the conventional glass. For this reason, the optical glass of the Embodiment 5 makes it possible to make background noise smaller than background noise in a fluorescence microscope according to the prior art.

Embodiment 8

Because the constitution and operation effect of the present embodiment are the same as those of the embodiment which are explained by referring to FIG. 3, respectively, the explanations of the constitution and operation effect of the present embodiment are omitted. However, a low fluorescent glass of the Embodiment 5 is used for the excitation light exit window 29, and an optical glass of the Embodiment 5 is used for the light entrance window 31, respectively.

Besides, an optical apparatus of the present invention is not limited to the above embodiments, and in another optical apparatus in which an optical glass of the present embodiments is used, the same effects are brought about.

The invention claimed is:

1. An optical glass comprising a basic glass composition that contains, at least;

| | |
|---|---|
| $SiO_2$ | 2-10% |
| $B_2O_3$ | 5-45%, and |
| $La_2O_3$ | 30-60% | by weight,
wherein the optical glass further comprises Cr, a content of which is in a range of 0.5-4.9 ppm with respect to 100% of the basic glass composition.

2. An optical glass comprising a basic glass composition that contains:

| | |
|---|---|
| $SiO_2$ | 2-10% |
| $B_2O_3$ | 5-45%, and |
| $La_2O_3$ | 30-60% |
| RO (R = Zn, Sr, Ca, Ba) | 0-15% |
| $Ln_2O_3$ (Ln = Y, Gd) | 0-40%, and |
| $ZrO_2 + Nb_2O_5 + Ta_2O_5$ | 0-30% | by weight,
wherein the optical glass further comprises Cr, a content of which is in a range of 0.5-4.9 ppm with respect to 100% of the basic glass composition.

3. The optical glass according to claim 1, further comprising, as a defoaming agent, at least one of $Sb_2O_3$, chloride, sulfide, and fluoride, a content of which is 0.01 to 1% by weight with respect 100% of to the basic glass composition.

4. The optical glass according to claim 1, further comprising at least one of $Li_2O$, $Na_2O$, $K_2O$, $Rb_2O$, and $Cs_2O$, a content of which is 0 to 10% by weight.

5. An optical apparatus comprising an optical system having the optical glass according to claim 1.

* * * * *

UNITED STATES PATENT AND TRADEMARK OFFICE
CERTIFICATE OF CORRECTION

PATENT NO. : 8,372,768 B2
APPLICATION NO. : 12/735022
DATED : February 12, 2013
INVENTOR(S) : Naoyuki Morisada It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 250 days.

Signed and Sealed this

First Day of September, 2015

Michelle K. Lee
*Director of the United States Patent and Trademark Office*